United States Patent
Kaneko

(10) Patent No.: US 9,307,150 B2
(45) Date of Patent: Apr. 5, 2016

(54) IMAGE PROCESSING DEVICE, IMAGE PROCESSING METHOD, AND PROGRAM FOR DISPLAY ANGLE DETERMINATION

(71) Applicant: CANON KABUSHIKI KAISHA, Tokyo (JP)

(72) Inventor: Chiaki Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 13/768,317

(22) Filed: Feb. 15, 2013

(65) Prior Publication Data
US 2013/0222656 A1    Aug. 29, 2013

(30) Foreign Application Priority Data
Feb. 28, 2012    (JP) .................................. 2012-041144

(51) Int. Cl.
| H04N 5/225 | (2006.01) |
| H04N 9/09 | (2006.01) |
| H04N 9/097 | (2006.01) |
| H04N 5/232 | (2006.01) |
| H04N 5/247 | (2006.01) |
| H04N 5/268 | (2006.01) |

(52) U.S. Cl.
CPC ........... *H04N 5/23293* (2013.01); *H04N 5/247* (2013.01); *H04N 5/268* (2013.01)

(58) Field of Classification Search
CPC .... H04N 5/247; H04N 5/23293; H04N 5/268
USPC ................. 348/262, 333.01, 333.05
See application file for complete search history.

(56) References Cited

U.S. PATENT DOCUMENTS

| 8,022,995 B2 | 9/2011 | Yamazaki et al. |
| 8,497,913 B2 | 7/2013 | Yamazaki et al. |
| 8,692,894 B2 | 4/2014 | Yamazaki et al. |
| 8,890,961 B2 | 11/2014 | Yamazaki et al. |
| 9,170,100 B2 | 10/2015 | Yamazaki et al. |

(Continued)

FOREIGN PATENT DOCUMENTS

| CN | 101577783 A | 11/2009 |
| CN | 101674413 A | 3/2010 |
| JP | 11-088912 A | 3/1999 |
| JP | 2010-206495 A | 9/2010 |

OTHER PUBLICATIONS

Dec. 1, 2015 Chinese Office Action corresponding to Chinese Patent Application No. 201310064423.5.

*Primary Examiner* — Antoinette Spinks
(74) *Attorney, Agent, or Firm* — Fitzpatrick, Cella, Harper & Scinto

(57) ABSTRACT

In a case of a camera array, the arrangement of image capturing units and the arrangement of captured images that are displayed do not agree with each other depending on the orientation of the camera at the time of image capturing and it is hard to grasp the correspondence relationship between both. An image processing device for processing a plurality of images represented by captured image data obtained by a camera array image capturing device including a plurality of image capturing units includes a determining unit configured to determine, on the basis of a display angle of the images in a display region, an arrangement of each image in the display region corresponding to each of the plurality of image capturing units, and the arrangement of each image in the display region is determined based on the arrangement of the plurality of image capturing units.

18 Claims, 21 Drawing Sheets

(56) References Cited

U.S. PATENT DOCUMENTS

2008/0180544 A1* 7/2008 Drader et al. ............... 348/223.1
2008/0204566 A1* 8/2008 Yamazaki et al. ....... 348/208.99
2011/0115933 A1 5/2011 Yamazaki et al.
2013/0222656 A1* 8/2013 Kaneko ......................... 348/262
2014/0152812 A1 6/2014 Yamazaki et al.

* cited by examiner

| IMAGE FILE | SIMULTANEOUS IMAGE CAPTURING FLAG | SIMULTANEOUS IMAGE CAPTURING Index |
|---|---|---|
| 301 { a1.jpg - camera01 | 1 | 001 |
| a2.jpg - camera02 | 1 | 001 |
| ⋮ | ⋮ | ⋮ |
| a9.jpg - camera09 | 1 | 001 |
| 302 ~ b.jpg - camera05 | 0 | - |
| 303 { c1.jpg - camera01 | 1 | 002 |
| ⋮ | ⋮ | ⋮ |
| c9.jpg - camera09 | 1 | 002 |
| ⋮ | | |

FIG.3

| n | x | y |
|---|---|---|
| 1 | 15 | 15 |
| 2 | 35 | 15 |
| 3 | 55 | 15 |
| 4 | 15 | 35 |
| ⋮ | ⋮ | ⋮ |
| 9 | 55 | 55 |

| n | x | y |
|---|---|---|
| 1 | −15 | 15 |
| 2 | −15 | 35 |
| 3 | −15 | 55 |
| 4 | −35 | 15 |
| ⋮ | ⋮ | ⋮ |
| 9 | −55 | 55 |

| IMAGE FILE | SIMULTANEOUS IMAGE CAPTURING FLAG | SIMULTANEOUS IMAGE CAPTURING Index | INCLINATION INFORMATION DURING IMAGE CAPTURING (ROTATION ANGLE $\psi$) |
|---|---|---|---|
| 1201 — XXX.jpg | 0 | - | - |
| 1202 — YYY.jpg | 0 | - | - |
| 1203 { Z1.jpg – camera01 | 1 | 001 | 91° |
| ⋮ | ⋮ | ⋮ | ⋮ |
| Z9.jpg – camera09 | 1 | 001 | 91° |
| 1204 { α1.jpg – camera01 | 1 | 002 | -1° |
| ⋮ | ⋮ | ⋮ | ⋮ |
| α9.jpg – camera09 | 1 | 002 | -1° |
| 1205 — βββ.jpg | 0 | - | - |
| 1206 — γγγ.jpg | 0 | - | - |

FIG.12

IMAGE PROCESSING DEVICE, IMAGE PROCESSING METHOD, AND PROGRAM FOR DISPLAY ANGLE DETERMINATION

BACKGROUND OF THE INVENTION

1. Field of the Invention

The present invention relates to a display method for displaying an image obtained by using a camera array image capturing device (also referred to simply as a "camera array", as known as camera array system, multiple lens camera, and the like) including a plurality of image capturing units.

2. Description of the Related Art

Conventionally, as a technique to display a plurality of captured images obtained at one time by a camera array image capturing device (hereinafter, referred to as a camera array) including a plurality of image capturing units, a list display technique to display two captured images arranged horizontally side by side is known (for example, Japanese Patent Laid-Open No. H11-088912 (1999)). By simultaneously outputting two captured images with a parallax captured by two image capturing units on the display by arranging them side by side in the horizontal direction, the list display technique makes it possible to check framing and exposure of both the captured images at one time.

On the other hand, in the case that a captured image obtained by using a general digital camera including a single image capturing unit is displayed, the display rotation technique is used generally, which rotates the orientation of a captured image in accordance with the orientation of the camera at the time of image capturing. For example, in the case where image capturing is performed with a camera held vertically, an image in which a subject is laid horizontally is displayed with the camera held as it is. However, by rotating the captured image by 90° and displaying it, it is made possible to cause the orientation of the camera at the time of image capturing to agree with the orientation of the captured image to be displayed.

In the conventional display rotation technique described above, by the rotation of the image about the image center of the captured image to be displayed as an axis, the orientation of the camera at the time of image capturing is caused to agree with the orientation of the captured image to be displayed. If this technique is applied to a list display of a group of captured images captured with the camera array held vertically, the individual captured images rotate about the image center as the origin. However, the order of arrangement of the list display (that is, the arrangement of captured images to be displayed) does not change before and after the rotation. Consequently, in the case where images are captured with the camera array held horizontally, in which rotation of the image is not necessary, no problem occurs, but, in the case where images are captured with the camera array held vertically, there arises such a problem that the arrangement of captured images to be displayed does not agree with the arrangement of the image capturing units within the camera array. That is, depending on the orientation (angle) of the camera array at the time of image capturing, the arrangement of image capturing units and the arrangement of captured images to be displayed sometimes agree with each other and sometimes not, and therefore, there has been such a problem that it is hard to grasp the correspondence relationship between both.

SUMMARY OF THE INVENTION

An image processing device according to the present invention is an image processing device for processing a plurality of images represented by captured image data obtained by capturing images with a camera array image capturing device including a plurality of image capturing units, the image processing device including a determining unit configured to determine, on the basis of a display angle of the images in a display region, an arrangement of each image in the display region corresponding to each of the plurality of image capturing units, wherein the arrangement of each of the images in the display region is determined based on the arrangement of the plurality of image capturing units.

According to the present invention, it is made possible to intuitively grasp the correspondence relationship between a captured image and an image capturing unit of the camera array that has captured the image. This facilitates grasping and managing the contents of data of images captured by the camera array.

Further features of the present invention will become apparent from the following description of exemplary embodiments (with reference to the attached drawings).

BRIEF DESCRIPTION OF THE DRAWINGS

FIG. 3 is a diagram showing an example of a data structure in the case that an image captured by a camera array is stored in a RAM;

FIG. 12 is a diagram showing an example of a data structure of captured image data according to the second embodiment;

DESCRIPTION OF THE EMBODIMENTS

[First Embodiment]

Hereinafter, preferred embodiments of the present invention are explained in detail. Configurations shown in the following embodiments are only examples and the present invention is not limited to the configurations shown schematically.

Figure 1:
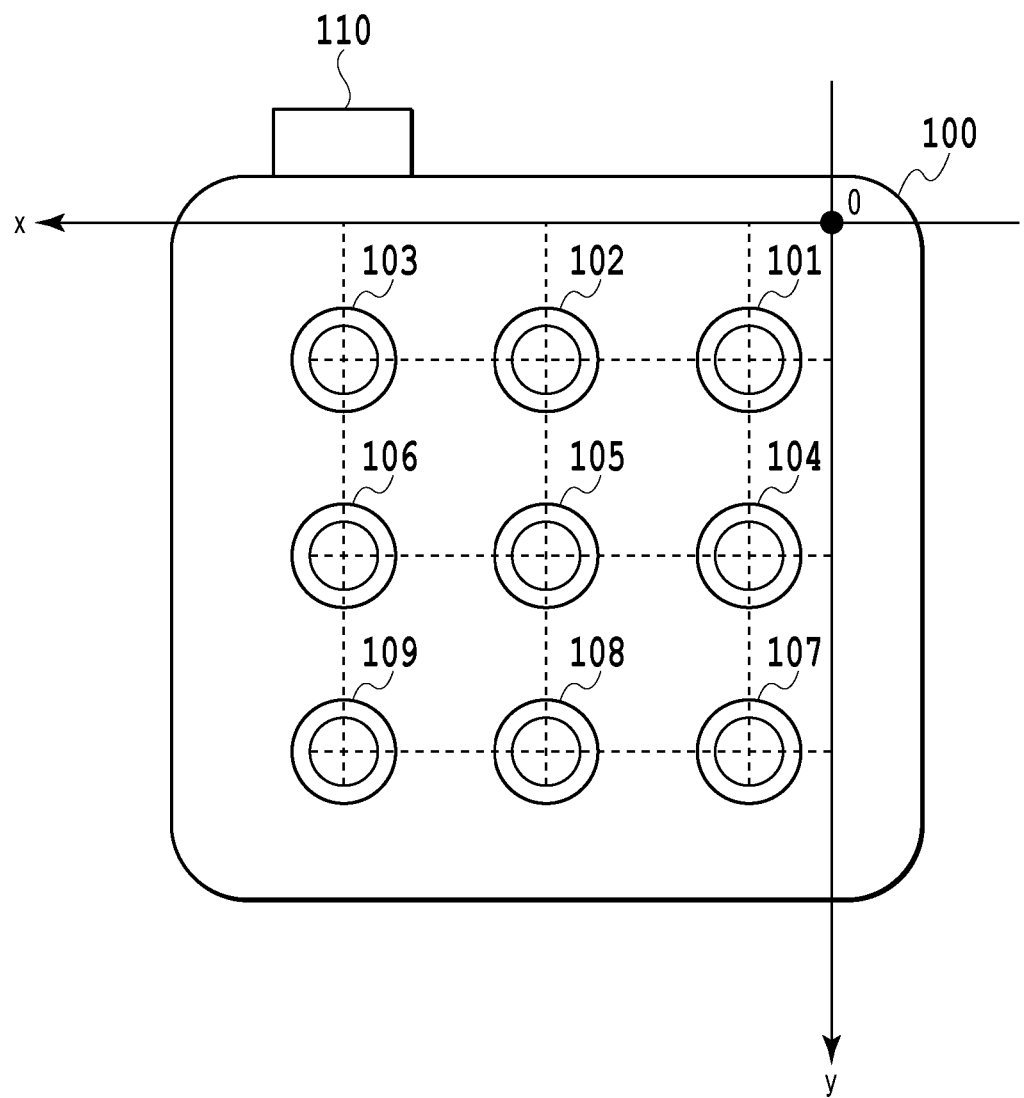
FIG. 1 is a diagram showing an external appearance of the front of a camera array according to a first embodiment.

FIG. 1 is a diagram showing an external appearance of the front of a camera array image capturing device (camera array) according to a first embodiment. In FIG. 1, a body of a camera array 100 includes nine image capturing units 101 to 109 that acquire an image and an image capturing button 110. In the case that the image capturing button 110 is pressed down, the image capturing units 101 to 109 receive light information of a subject with a sensor (image capturing element) and the received signal is A/D-converted and captured image data (digital data) including a plurality of captured images is acquired at the same time. By such a camera array, it is possible to obtain a group of captured images in which the same subject is captured from a plurality of viewpoints.

Here, the nine image capturing units 101 to 109 are located on square lattice points of N×N (here, N=3) as shown in FIG. 1. That is, each row of the image capturing units 101 to 103, the image capturing units 104 to 106, and the image capturing units 107 to 109 is arranged in parallel to the surface of the ground as a result. Then, in the case of captured image data obtained by capturing images with the camera array 100 held horizontally, each captured image is displayed in such a manner that the arrangement of each captured image always agrees with the arrangement of the image capturing units 101 to 109 (see captured image data 1204 of FIG. 13, to be described later). In this case, the image capturing units (lenses) are directed toward the subject, and therefore, the arrangement of the image capturing units 101 to 109 in FIG. 1 is an arrangement in line symmetry about a y-axis.

On the other hand, in the case where images are captured, for example, with the camera array 100 inclined by 90 degrees in a clockwise direction (vertically), the top surface of the body where the image capturing button 110 is located is vertical to the surface of the ground, and therefore, in this case, the direction of each row of the image capturing units is vertical to the surface of the ground. Consequently, if each captured image is displayed as it is only by rotating each captured image by 90 degrees, the arrangement of each captured image does not agree with the arrangement of the image capturing units in which each of the rows is vertical to the surface of the ground (see FIG. 11B, to be described later).

Therefore, in the present embodiment, in the case that captured image data obtained by a camera array is displayed, the orientation of each captured image is rotated in accordance with the orientation of the camera array at the time of image capturing and also the arrangement of each captured image is changed appropriately to avoid such a discrepancy described above, and then display is performed.

In the example of FIG. 1, the number of image capturing units is nine, but, the number of image capturing units is not limited to nine. Further, the arrangement of image capturing units is not limited to the square shape of N×N and for example, it may also be possible to arrange image capturing units in a radial shape or in the shape of a straight line, or quite randomly.

Figure 2:
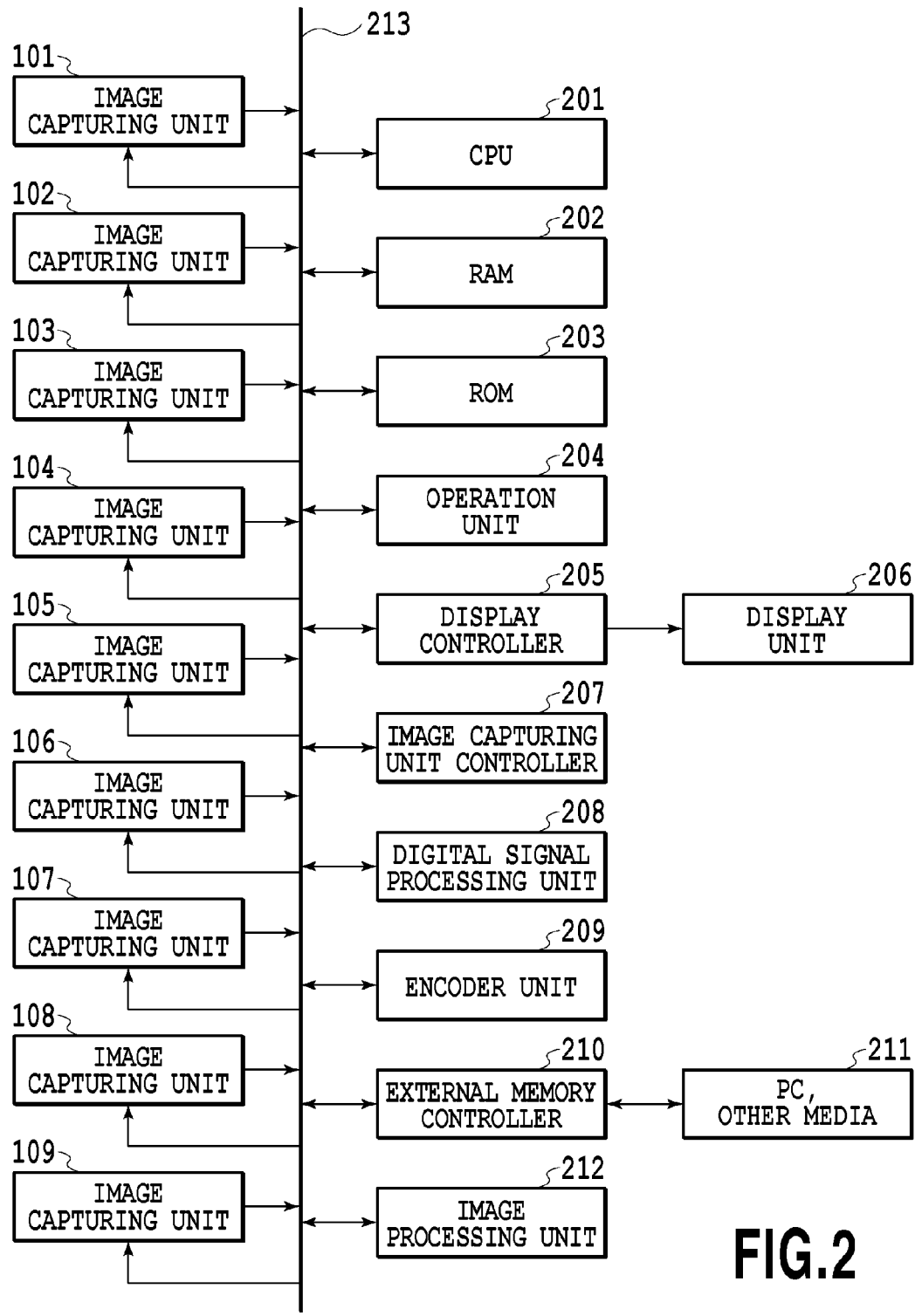
FIG. 2 is a functional block diagram showing an internal configuration of the camera array according to the first embodiment.

FIG. 2 is a functional block diagram showing an internal configuration of the camera array 100. A central processing unit (CPU) 201 totally controls each unit to be described below. A RAM 202 functions as a main memory, work area, etc., of the CPU 201 and also temporarily stores captured image data acquired by the image capturing units 101 to 109 etc. A ROM 203 stores control programs etc. to be executed by the CPU 201. A bus 213 is a transfer path of various kinds of data and for example, captured image data acquired by the image capturing units 101 to 109 is sent to a predetermined processing unit via the bus 213. An operation unit 204 for a user to perform an input operation includes buttons, mode dials, etc. A display unit 206 that displays captured images and characters uses, for example, a liquid crystal display. The display unit 206 may have a touch screen function and in such a case, it is also possible to handle a user's instruction using the touch screen as an input of the operation unit 204. A display controller 205 controls a display of captured images and characters displayed on the display unit 206. An image capturing unit controller 207 performs control of an image capturing system based on instructions from the CPU 201, such as focusing, opening/closing of a shutter, and adjustment of a stop. A digital signal processing unit 208 performs various kinds of processing on the digital data received via the bus 213, such as white balance processing, gamma processing, and noise reduction processing. An encoder unit 209 performs processing to convert digital data into a file format, such as JPEG and MPEG. An external memory controller 210 is an interface to connect to a PC and other media 211 (for example, a hard disk, memory card, CF card, SD card, USB memory). An image processing unit 212 performs image processing by making use of the captured image data acquired by the image capturing units 101 to 109 or the digital image data output from the digital signal processing unit 208.

FIG. 3 shows an example of a data structure in the case that images captured by the camera array 100 are stored in the RAM 202 as captured image data. In the example of FIG. 3, image data 301 to 303 corresponding to three-time image capturing is included and each piece of captured image data is configured by an image file (here, in the jpeg format), a simultaneous image capturing flag, and a simultaneous image capturing index. The captured image data 301 includes nine files of images captured simultaneously by the image capturing units 101 to 109. Then, a flag (simultaneous image capturing flag) "1" indicating that the images are captured simultaneously by a plurality of image capturing units and an index (simultaneous image capturing Index) "001" for distinguishing image data from another data of images simultaneously captured are given. The captured image data 303 also includes nine image files as the captured image data 301 and "1" is given to the simultaneous image capturing flag and "002" is given as the simultaneous image capturing Index. On the other hand, the captured image data 302 is data of an image captured by the single image capturing unit (here, the image capturing unit 105), and therefore, has only one image file. In this case, a value of "0" of the simultaneous image capturing flag indicates that the image is not captured simultaneously by a plurality of image capturing units.

The contents of the image file name, the simultaneous image capturing flag, and the simultaneous image capturing Index are allocated automatically by the CPU 201 in the case that the digital data obtained by image capturing is stored in the RAM 202 as captured image data.

Figure 4:
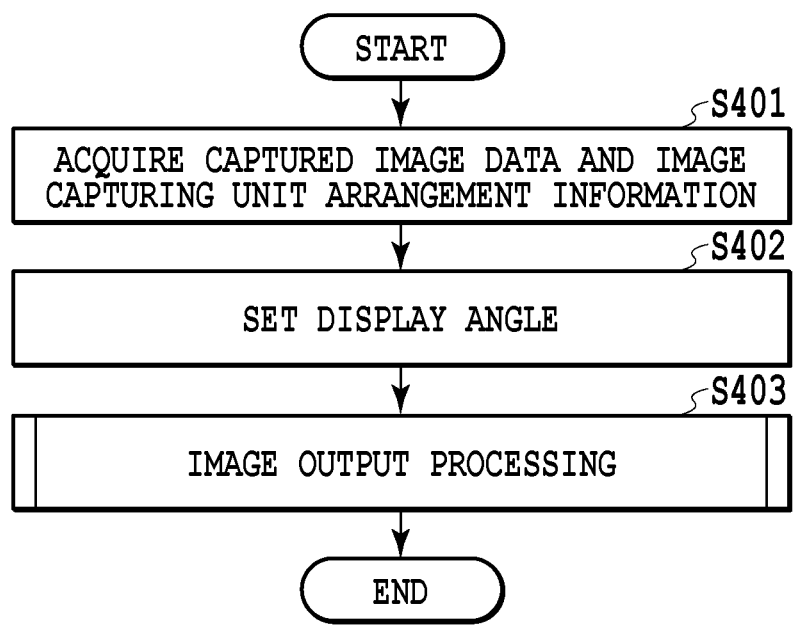
FIG. 4 is a flowchart showing a flow of a series of processing in an image processing unit according to the first embodiment.

FIG. 4 is a flowchart showing a flow of a series of processing in the image processing unit 212. This processing is performed by the CPU 201 executing computer-executable programs in which the procedure shown below is described after reading the programs from the ROM 203 onto the RAM 202.

At step 401, the image processing unit 212 acquires captured image data and arrangement information of the image capturing units within the camera array used for image capturing of the captured image data.

At step 402, the image processing unit 212 sets a display angle in the case that displaying captured image data on the display unit 206 (display angle setting processing).

At step 403, the image processing unit 212 rotates each image within captured image data and also determines an arrangement of each image to display captured image data based on the acquired arrangement information of the image capturing units and the set display angle (image output processing).

It is possible to effectively apply such a function of the image processing unit 212 also in the case that, for example, taking the captured image data stored in a USB memory etc. into a PC for display. That is, in the case that displaying on the monitor of the PC captured image data which is captured by the camera array, it is possible to produce a display after performing the same image processing within the PC. That is, the image processing unit 212 according to the present embodiment can be formed as an independent image processing device and can be implemented by being appropriately incorporated in the camera array main body, a PC, etc.

Hereinafter, details of each processing performed in the image processing unit 212 are explained.

<Acquisition of Captured Image Data and Arrangement Information of Image Capturing Units>

The captured image data acquired at step 401 is as described above. At step 401, at the same time, information about arrangement of the image capturing units (hereinafter, referred to as "image capturing unit arrangement information") of the camera array used for image capturing of the captured image data is acquired. The image capturing unit arrangement information is information indicating a relative positional relationship of each image capturing unit to the body of the camera array and the information stored in the RAM 202 etc. at the time of image capturing is read. In the present embodiment, it is premised that all pieces of the captured image data are captured by the above-described camera array 100, and therefore, the configuration is such that image capturing unit arrangement information stored in advance in the RAM etc. is acquired separately. However, for example, in the case where a large amount of captured image data stored in an external memory is displayed, it can be thought that captured image data captured by a camera array with different specifications, such as the different number of image capturing units, is included mixedly. In such a case, it may also be possible to associate the captured image data itself with the image capturing unit arrangement information of the camera array used for image capturing and to acquire it together with the captured image data.

In the following explanation in the present embodiment, a case is explained as an example, in which captured image data including nine image files (corresponding to 301 of FIG. 3) obtained by capturing images of a subject vertically using the camera array 100 shown in FIG. 1 is displayed on the display unit 206.

Figure 5:
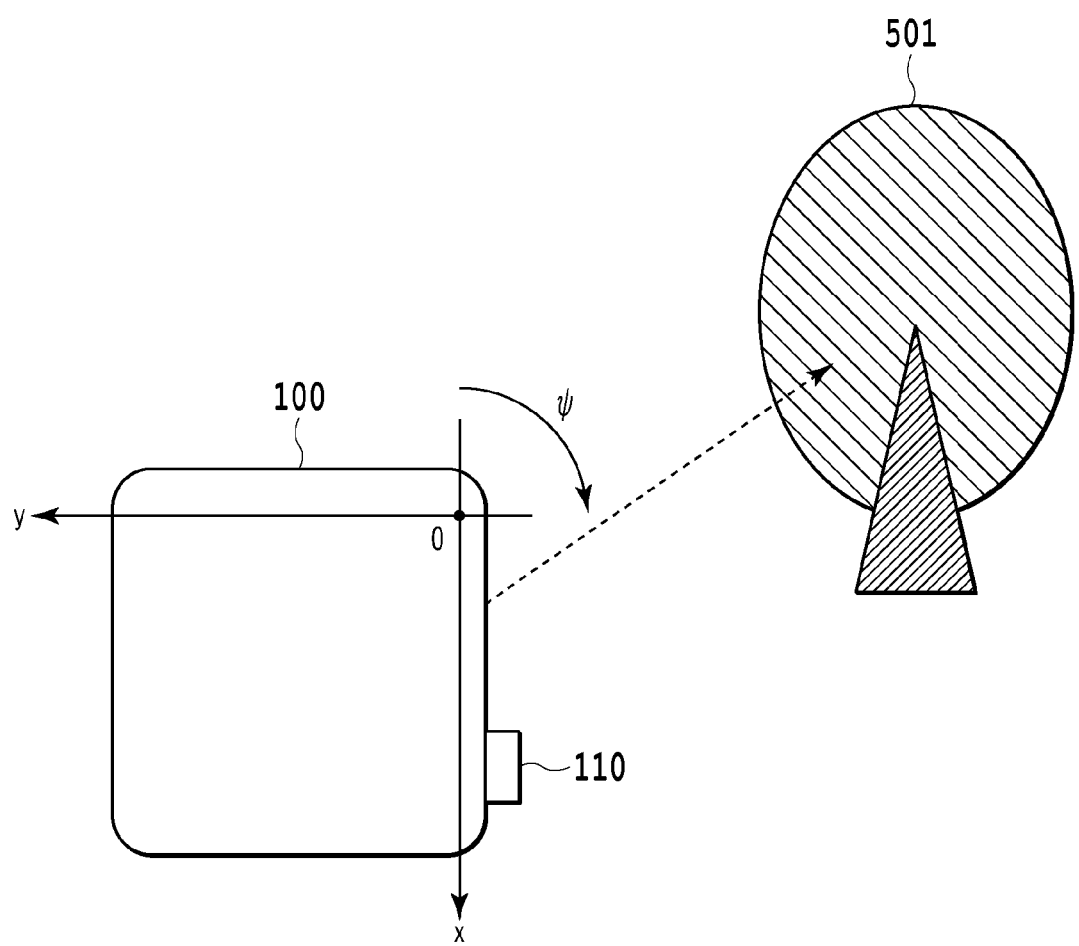
FIG. 5 is a diagram for explaining the way an image of a subject is captured with a camera array held vertically. A flowchart showing a flow of image output processing in a second embodiment.

FIG. 5 is a diagram for explaining the way the image of a tree 501, which is a subject, is captured with the camera array 100 held vertically. The image capturing button 110 on the top of the body is located at the lower part of the right side surface and an x-axis and a y-axis passing through an origin O are interchanged, and therefore, it is known that the camera array 100 is directed toward the subject 501 in the state of being inclined by 90 degrees in the clockwise direction.

Figure 6:
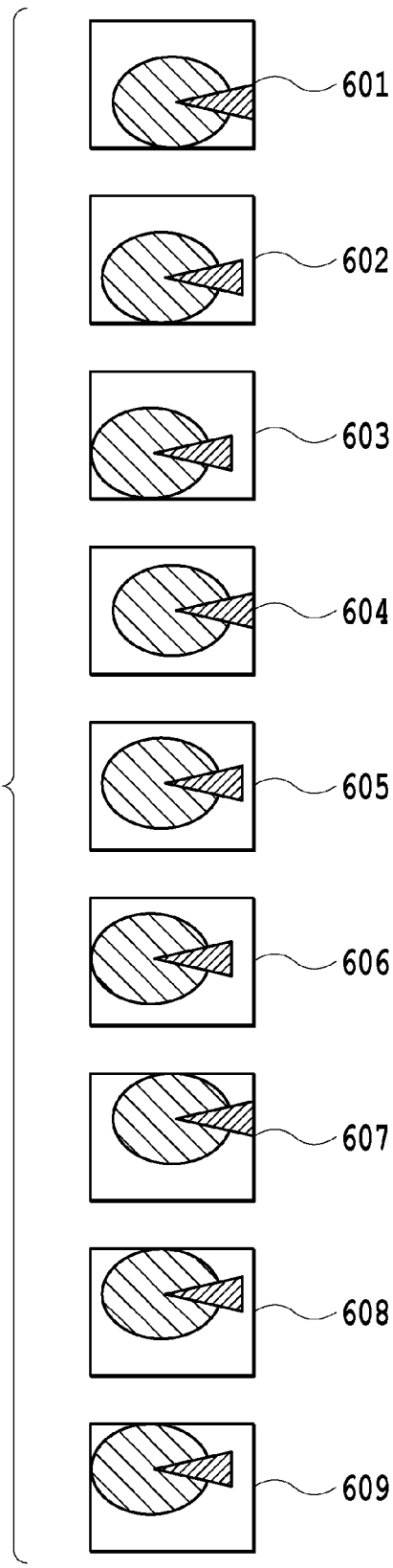
FIG. 6 is a diagram showing captured images with a parallax captured vertically.

FIG. 6 shows captured images 601 to 609 with a parallax captured in the state shown in FIG. 5 and the captured image 601 corresponds to the image capturing unit 101, the captured image 602 corresponds to the image capturing unit 102, ..., and the captured image 609 corresponds to the image capturing unit 109, respectively.

Figures 7A, 7B:
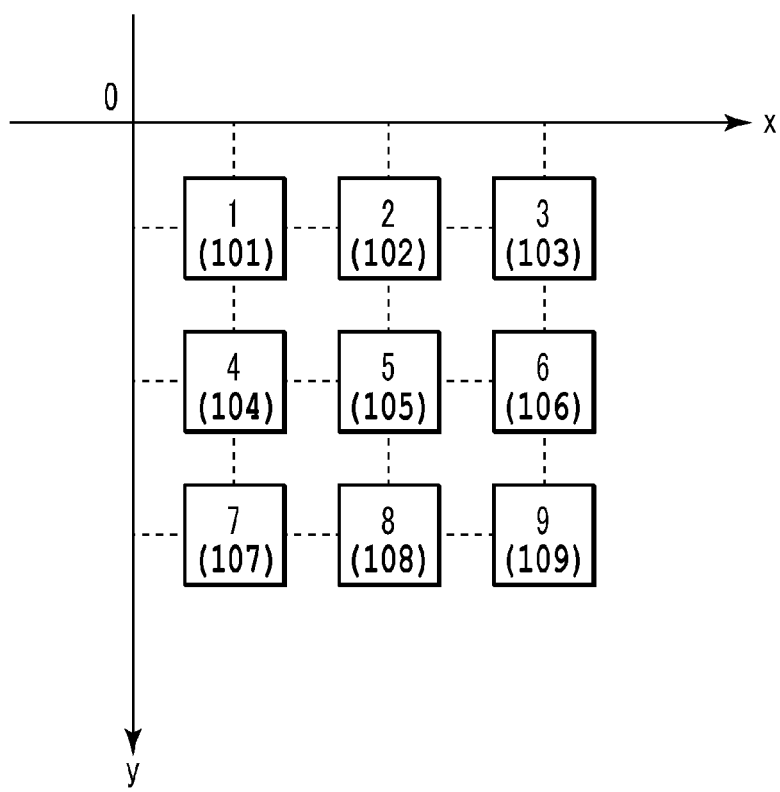
FIG. 7A shows an example of a table stored as image capturing unit arrangement information and FIG. 7B is a diagram showing an example of an image arrangement corresponding to the table.

Then, FIG. 7A is an example of a table stored as image capturing unit arrangement information in the RAM 202 etc. In the table shown in FIG. 7A, n is an index to identify the image capturing unit, and x and y are two-dimensional coordinates with the point O on the body of the camera array 100 as an origin. For example, the index n=1 corresponds to the image capturing unit 101 and indicates that the distance from the origin O is 15 in the x and y directions, respectively. FIG. 7B shows the image arrangement corresponding to this table and numerals 1 to 9 within rectangles show the index n to identify the image capturing unit and numerals within brackets thereunder show the corresponding image capturing units 101 to 109. The image capturing unit arrangement information is only required to be data with which the arrangement of the image capturing unit relative to the body of the camera array 100 can be known and the format of data is not limited to the example of the table described above.

<Display Angle Setting Processing>

In the display angle setting processing at step 402, an angle in the case that displaying the acquired captured image data on the display unit 206 is set. In detail, an angle (for example, 0°, +90°, −90°, 180°, etc.) specified by a user via the operation unit 204 is acquired as a display angle θ and stored in the RAM 202.

Instead of setting an angle specified by a user as the display angle θ, for example, it may also be possible to acquire information about inclination of the camera array during capturing (hereinafter, referred to as "inclination information during image capturing") of captured image data, which is to be displayed, and to set the information as the display angle θ. As the inclination information during image capturing to be acquired, for example, it may also be possible to store the contents (for example, without rotation, clockwise rotation, counterclockwise rotation, upside down, etc.) specified by a user via the operation unit 204 at the time of image capturing in the RAM 202 etc. Alternatively, it may also be possible to attach an acceleration sensor to the body to automatically acquire a rotation angle ψ of the body with respect to the vertical direction at the time of image capturing and to store it in the RAM 202 etc. in association with the captured image data. Then, the display angle θ may be set based on the inclination information during image capturing (rotation angle ψ) read from the RAM 202 etc.

Then, in the case where a user is caused to specify inclination information during image capturing, the display angle θ is set in accordance with the specified contents (for example, in the case of no rotation, the display angle θ=0 degrees is set). In the case where the inclination information during image capturing (rotation angle ψ) acquired automatically by the acceleration sensor at the time of image capturing is used, the display angle θ is calculated and set according to Formula (I) in accordance with the acquired rotation angle ψ.

[Expression 1]

$$\theta = \begin{cases} 0° & (-45° \le \psi \le 45°) \\ +90° & (45° < \psi \le 135°) \\ -90° & (-135° \le \psi < -45°) \\ 180° & (-180° < \psi < -135°, 135° < \psi \le 180°) \end{cases} \quad \text{Formula (1)}$$

As described above, it is also possible to automatically acquire information about the inclination of the camera at the time of image capturing using the acceleration sensor and to automatically set the display angle in accordance with the inclination information. In this case, it is possible to considerably reduce time and effort of a user required to set the display angle.

<Image Output Processing>

In the image output processing at step 403, captured image data is displayed by rotating each image in the captured image data based on the set display angle θ and further by determining the arrangement of each image based on the acquired image capturing unit arrangement information so that the arrangement of each image after rotation agrees with the arrangement of each image capturing unit at the time of image capturing. Hereinafter, detailed explanation is provided.

Figure 8:
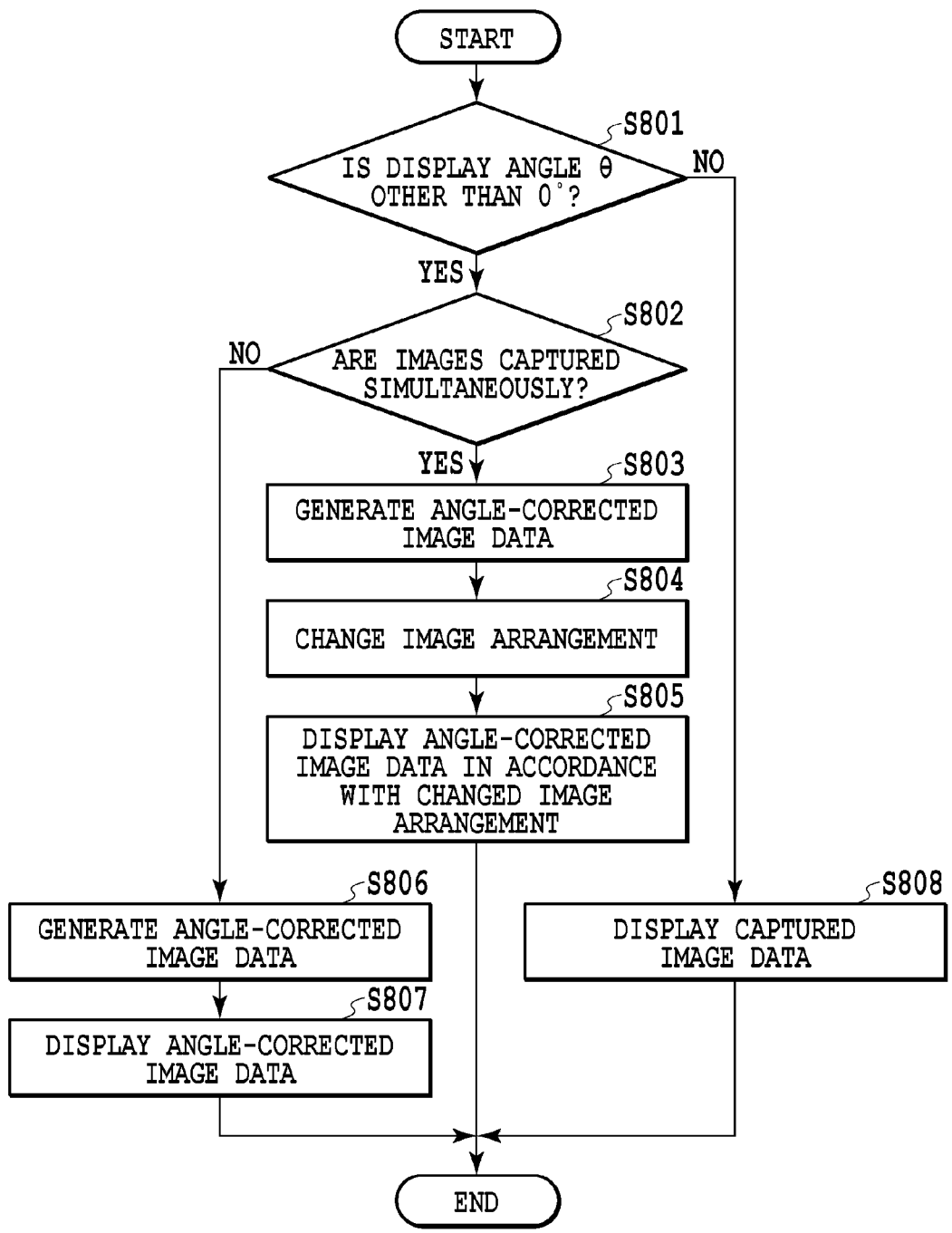
FIG. 8 is a flowchart showing a flow of image output processing.

FIG. 8 is a flowchart showing a flow of image output processing. As described above, here, a case is explained where the captured image data (301 in FIG. 3) including nine image files obtained by capturing the images of the subject vertically is displayed on the display unit 206.

At step 801, the image processing unit 212 determines whether the display angle θ set at step 402 is an angle other than 0 degrees. In the case that the display angle θ is an angle other than 0 degrees, the procedure proceeds to step 802. On the other hand, in the case that the display angle θ is 0 degrees, the procedure proceeds to step 808 and the image processing unit 212 outputs the captured image data acquired at step 401 as it is (in the case where the simultaneous image capturing flag is "1", in accordance with the image arrangement information) to the display unit 206.

At step 802, the image processing unit 212 refers to the simultaneous image capturing flag in the captured image data 301 acquired at step 401 and determines whether images of each image file within the captured image data 301 are captured simultaneously. In the case where it is determined that the images of each image file are captured simultaneously, the procedure proceeds to step 803. On the other hand, in the case where it is determined that the images of each image file are not captured simultaneously, the procedure proceeds to step 806. The simultaneous image capturing flag of the captured image data 301 is "1", and therefore, the procedure proceeds to step 803 as a result.

Figure 9:
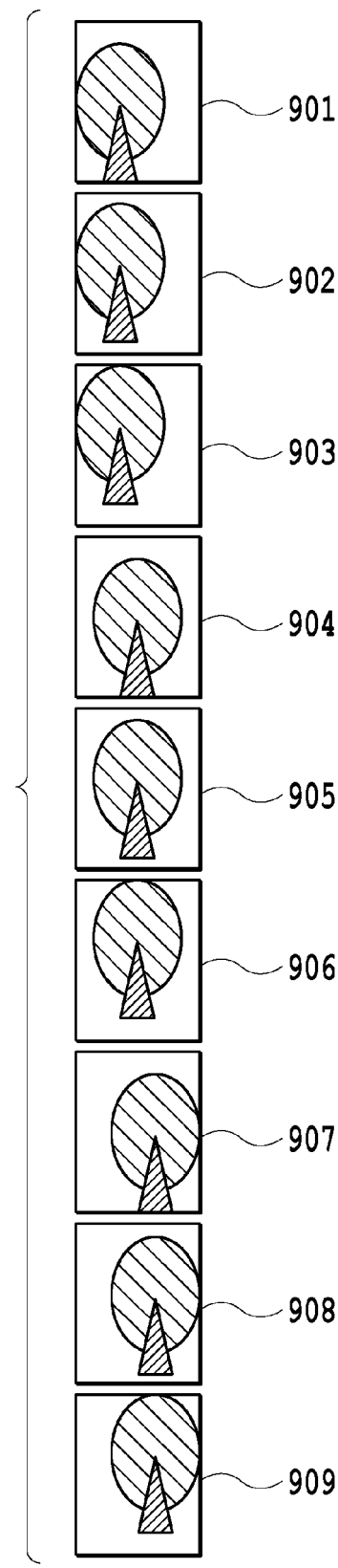
FIG. 9 is a diagram showing angle-corrected image data generated in the case of a display angle $\theta=+90°$.

At step 803, the image processing unit 212 rotates the individual images of the nine image files within the captured image data 301 acquired at step 401 by the display angle θ set at step 402 to generate a group of angle-corrected images (angle-corrected image data). FIG. 9 shows angle-corrected image data including angle-corrected images 901 to 909 generated in the case of display angle θ=+90° based on the nine captured images 601 to 609 shown in FIG. 6 described previously. In FIG. 9, the angle-corrected images 901 to 909 correspond to the captured images 601 to 609 in FIG. 6, respectively.

Figures 10A, 10B:
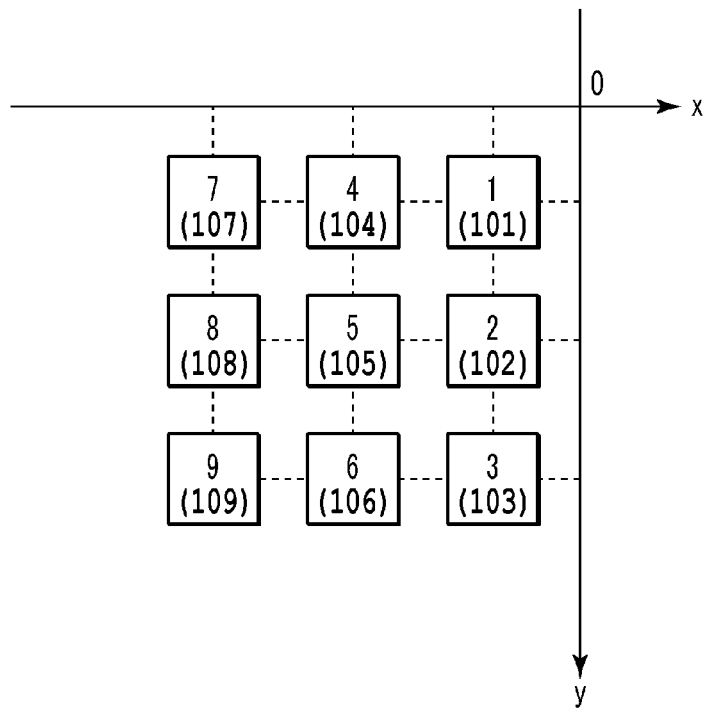
FIGS. 10A and 10B are diagrams for explaining the way a new arrangement in the case of the display angle $\theta=+90°$ is determined.

At step 804, the image processing unit 212 changes the arrangement of each of the angle-corrected images 901 to 909 within the generated angle-corrected image data based on the image capturing unit arrangement information acquired at step 401 and the display angle θ set at step 402. Specifically, the image processing unit 212 refers to the image capturing unit arrangement information and determines a new arrangement so that the arrangement of each of the angle-corrected images (in the case of the present embodiment, in the vertical and horizontal directions) is the same as the arrangement of each of the image capturing units in the case with reference to the state where the camera array 100 is held directed toward a subject at the time of image capturing. FIGS. 10A and 10B are diagrams for explaining how a new arrangement is determined in the case of display angle θ=+90°. FIG. 10A is a table indicating a relative positional relationship between each image capturing unit relative to the subject with reference to the state (where the camera array 100 is inclined by 90 degrees in the clockwise direction) at the time of image capturing, and FIG. 10B shows an arrangement of the angle-corrected images changed so as to correspond to the table. It is known that in the case of the captured image data in the case where images are captured by the camera array 100 inclined by 90 degrees in the clockwise direction, the arrangement is such that the captured image by the image capturing unit 101 is located at the upper right, the captured image by the image capturing unit 103 at the bottom right, the captured image by the image capturing unit 107 at the upper left and the captured image by the image capturing unit 109 at the bottom left.

At step 805, the image processing unit 212 changes the arrangement of the angle-corrected images 901 to 909 generated at step 803 in accordance with the arrangement determined at step 804 and outputs to the display unit 206 the angle-corrected image data the arrangement of which is changed.

Figure 11A:
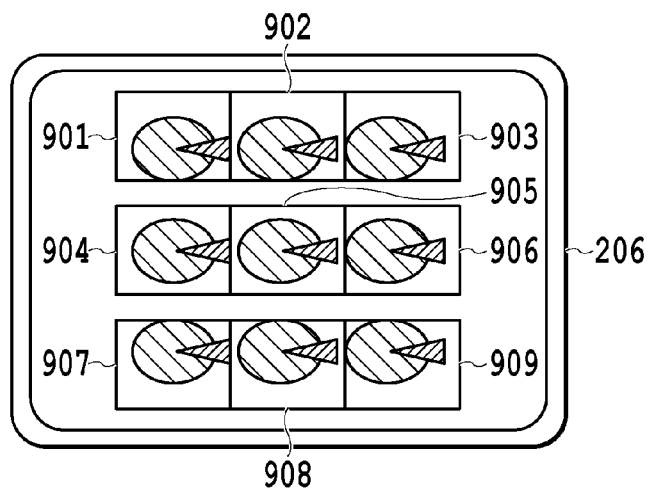
FIGS. 11A to 11C are diagrams each showing an example of a UI screen displayed on a display unit.
Figure 11B:
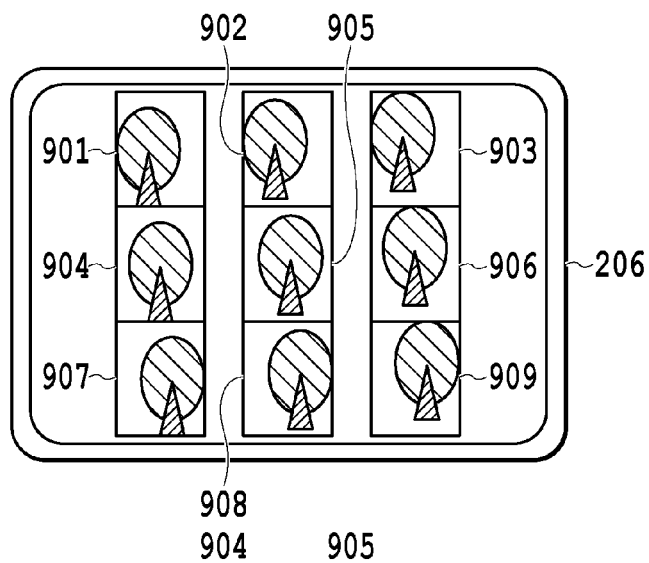
Figure 11C:
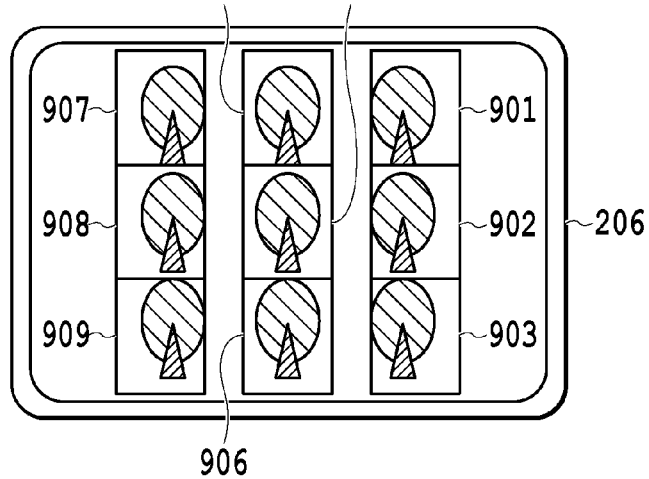

FIGS. 11A to 11C each show an example of the UI screen displayed on the display unit 206. FIG. 11A is a display example in the case of outputting the captured image data without performing angle correction or changing the arrangement and FIG. 11B is a display example in the case of performing only the angle correction but not changing the arrangement. It is known that the arrangement of the images 901 to 909 does not agree with the arrangement of each image capturing unit in the case that the camera array is held vertically in each case. FIG. 11C is a display example in the case of changing the arrangement after angle correction and it is known that the arrangement of the images 901 to 909 agrees with the arrangement (see FIG. 10B) of each image capturing unit in the case that the camera array is held vertically.

At step 806, the image processing unit 212 rotates each image file within the captured image data acquired at step 401 by the display angle θ set at step 402 to generate an angle-corrected image (angle-corrected image data).

At step 807, the image processing unit 212 outputs the angle-corrected image data generated at step 805 to the display unit 206.

In this manner, the arrangement of each image in the display unit is determined so that the positional relationship of each image agrees with the positional relationship of the plurality of image capturing units.

As above, according to the invention of the present embodiment, the arrangement in the display of the captured image data agrees with the arrangement of the image capturing units in the case that capturing the image and it is possible to intuitively grasp the correspondence relationship between the captured image and the image capturing unit that has captured the image.

[Second Embodiment]

In the first embodiment, the case is explained where the captured image data including nine image files obtained by one-time image capturing is displayed. Next, a case is explained as a second embodiment where captured image data obtained by multiple-time image capturing is displayed, in which captured image data captured by a general digital camera having a single image capturing unit is included mixedly. Explanation of parts common to those of the first embodiment is simplified or omitted and here, different points are explained mainly.

FIG. 12 shows an example of a data structure of captured image data in the present embodiment. Captured image data denoted by reference numerals 1201, 1202, 1205, and 1206 is data including one image file the images of which are captured by a digital camera having a single image capturing unit. Captured image data denoted by reference numerals 1203 and 1204 is data including nine image files the images of which are captured simultaneously by the camera array 100 having the image capturing units 101 to 109. FIG. 12 differs from FIG. 3 in that the inclination information during image capturing described previously is added to the captured image data 1203 and 1204. Although not shown schematically in FIG. 12, to the captured image data 1203 and 1204, the image capturing unit arrangement information described previously is also added.

In this case, first, the processing at step 401 and step 402 in the flowchart of FIG. 4 is performed on the captured image data 1201 to 1206 and the display angle θ in the case that displaying each piece of captured image data on the display unit 206 is set for each piece of captured image data.

Then, in the image output processing at step 403, in accordance with the set display angle θ and the contents of the simultaneous image capturing flag, necessary angle-corrected image data is generated and the arrangement of the angle-corrected image is changed for each piece of captured image data. Then, the arrangement of the whole including the angle-corrected image data the arrangement of which is changed appropriately and captured image data other than the angle-corrected image data is determined.

In the processing described above, whether the captured image data is data corresponding to one-time image capturing is determined with reference to the simultaneous image capturing flag and the simultaneous image capturing Index. Specifically, in the case that the simultaneous image capturing flag is "0", the image file is handled as single captured image data and in the case that the simultaneous image capturing flag is "1", a group of image files having the common simultaneous image capturing Index is handled as one piece of captured image data. Both the captured image data by a general digital camera and the captured image data obtained by image capturing by a camera array using only one of a plurality of image capturing units include only one image file and it is sufficient to handle both as equivalent to each other.

Then, in accordance with the arrangement of the whole determined as described above, each angle-corrected image or a captured image the angle of which is not corrected is arranged and output to the display unit 206.

Figure 13:
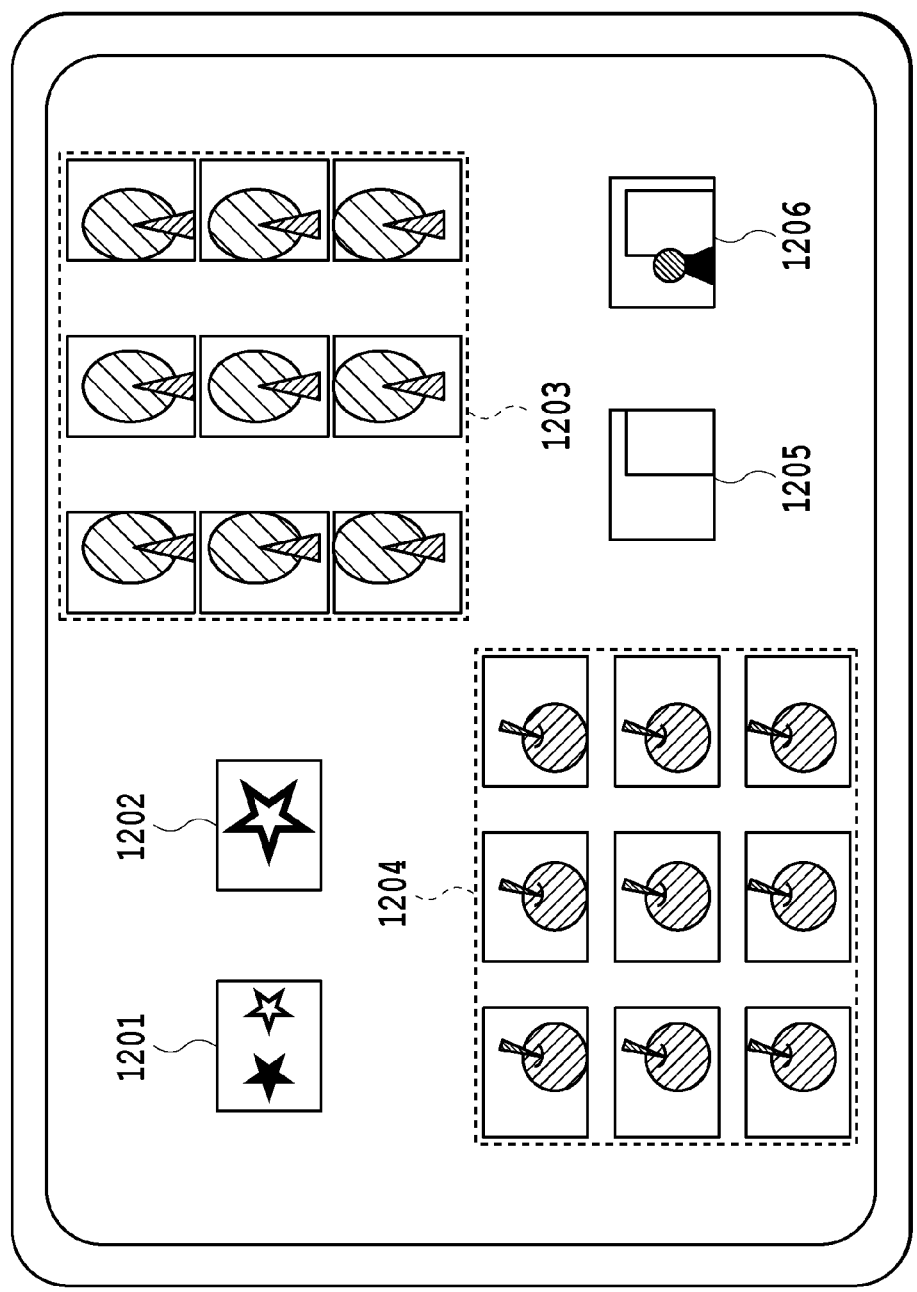
FIG. 13 is a diagram showing an output example in the second embodiment.

FIG. 13 shows the way the captured image data 1201 to 1209 shown in FIG. 12 is displayed on the display unit 206 by the processing described above. The captured image data 1201, 1202, 1205, and 1206 the images of which are captured by a general digital camera is displayed without display angle correction. The captured image data 1204 the image of which is captured with the camera array held horizontally is also displayed without display angle correction and without arrangement change. In contrast to this, the captured image data 1203 the image of which is captured with the camera array held vertically is displayed after the display angle is corrected and then the arrangement is changed so as to be the same as the arrangement of the image capturing units at the time of image capturing.

According to the present embodiment, even in the case where various kinds of captured image data exist mixedly, it is possible to cause the arrangement in the display of the captured image data to agree with the arrangement of the image capturing units in the case that capturing the image for all pieces of the captured image data.

[Third Embodiment]

Next, an aspect is explained as a third embodiment, in which only captured images selected by a user are displayed among a plurality of captured images obtained by a camera array. Explanation of parts common to those of the first and second embodiments is simplified or omitted and here, different points are explained mainly.

Figure 14:
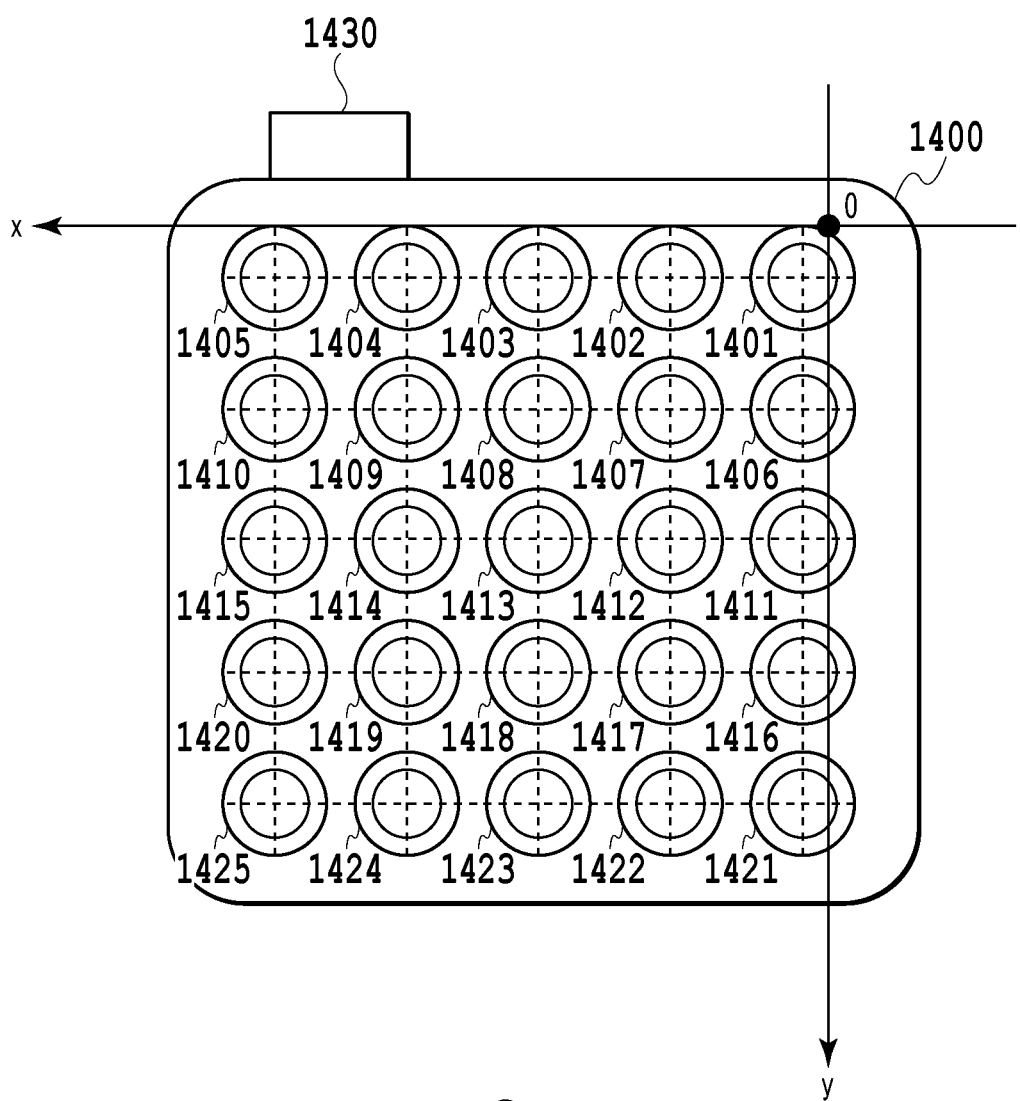
FIG. 14 is a diagram showing an external appearance of a camera array used in a third embodiment.

FIG. 14 is a diagram showing an external appearance of a camera array used in the present embodiment. In FIG. 14, the body of a camera array 1400 includes 25 image capturing units 1401 to 1425 that capture images and an image capturing button 1430. The internal configuration is the same as that of the camera array 100 in the first embodiment except in that the number of image capturing units is different and the flow of processing in the image processing unit 212 is also substantially the same. The present embodiment is characterized by the image output processing at step 403 in the flowchart of FIG. 4, and therefore, hereinafter, the contents of the image output processing are explained mainly.

Figure 15:
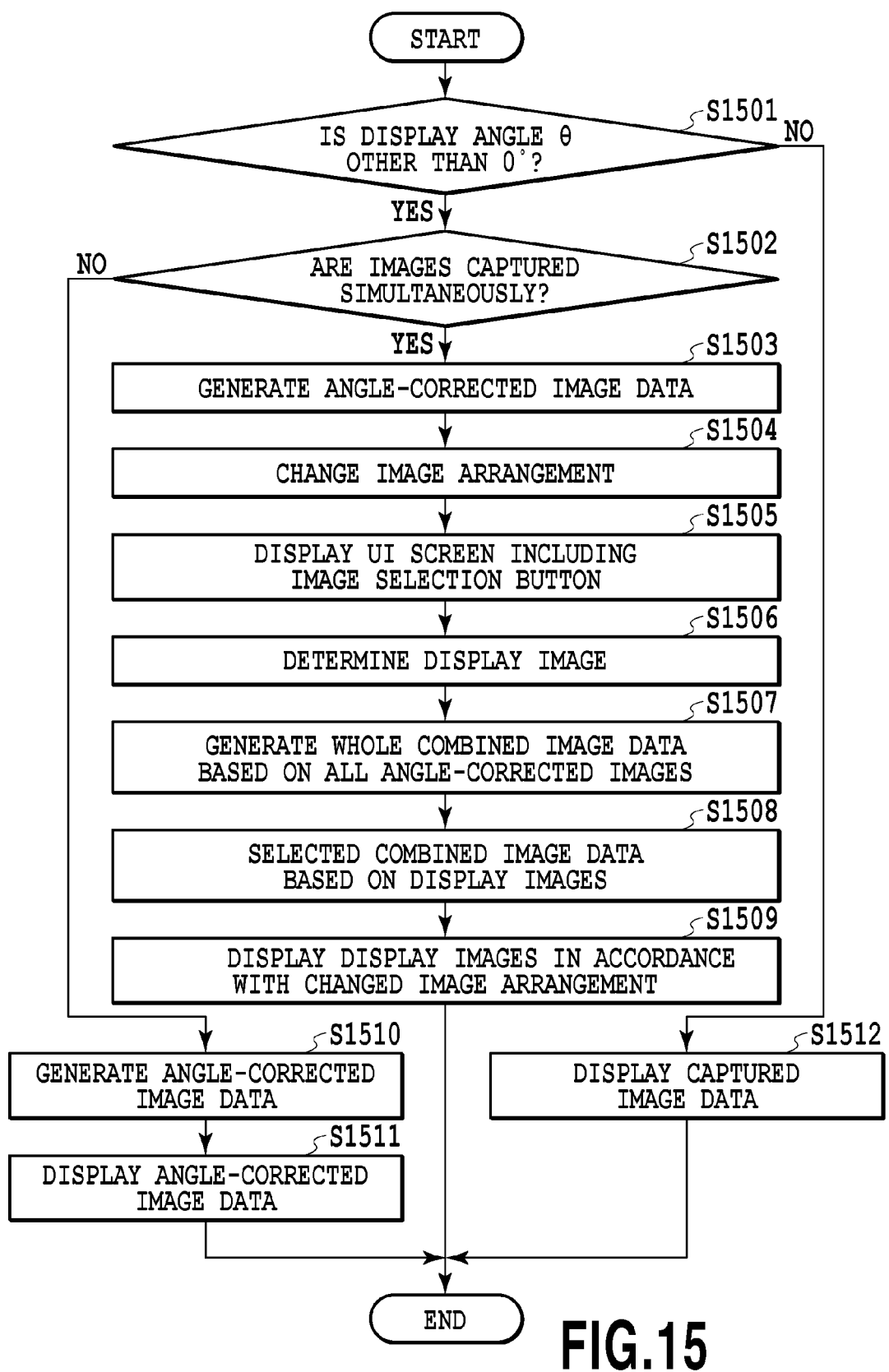
FIG. 15 is a flowchart showing a flow of image output processing according to the third embodiment.

FIG. 15 is a flowchart showing a flow of the image output processing according to the present embodiment.

In the case that the display angle is set at step 402 based on the captured image data and the image capturing unit arrangement information acquired at step 401, whether the set display angle θ is an angle other than 0 degrees and whether images are captured simultaneously are determined (steps 1501 and 1502). Each processing at step 1510 to step 1512 in the case where the determination result is "No" at steps 1501 and 1502 corresponds to each processing at step 806 to step 808 in the flowchart of FIG. 8 in the first embodiment. Here, the processing at step 1503 and later steps of a case (a case where the determination result is "Yes" at both steps 1501 and 1502) that most characterizes the present embodiment is explained in detail. In the following, a case is explained as an example where processing is performed on captured image data obtained by capturing the image of the subject 501 with the camera array 1400 shown in FIG. 14 held vertically as shown in FIG. 5 described previously.

At step 1503, the image processing unit 212 rotates each image of the 25 image files within the captured image data acquired at step 401 by the display angle θ set at step 402 to generate angle-corrected image data.

Figure 16:
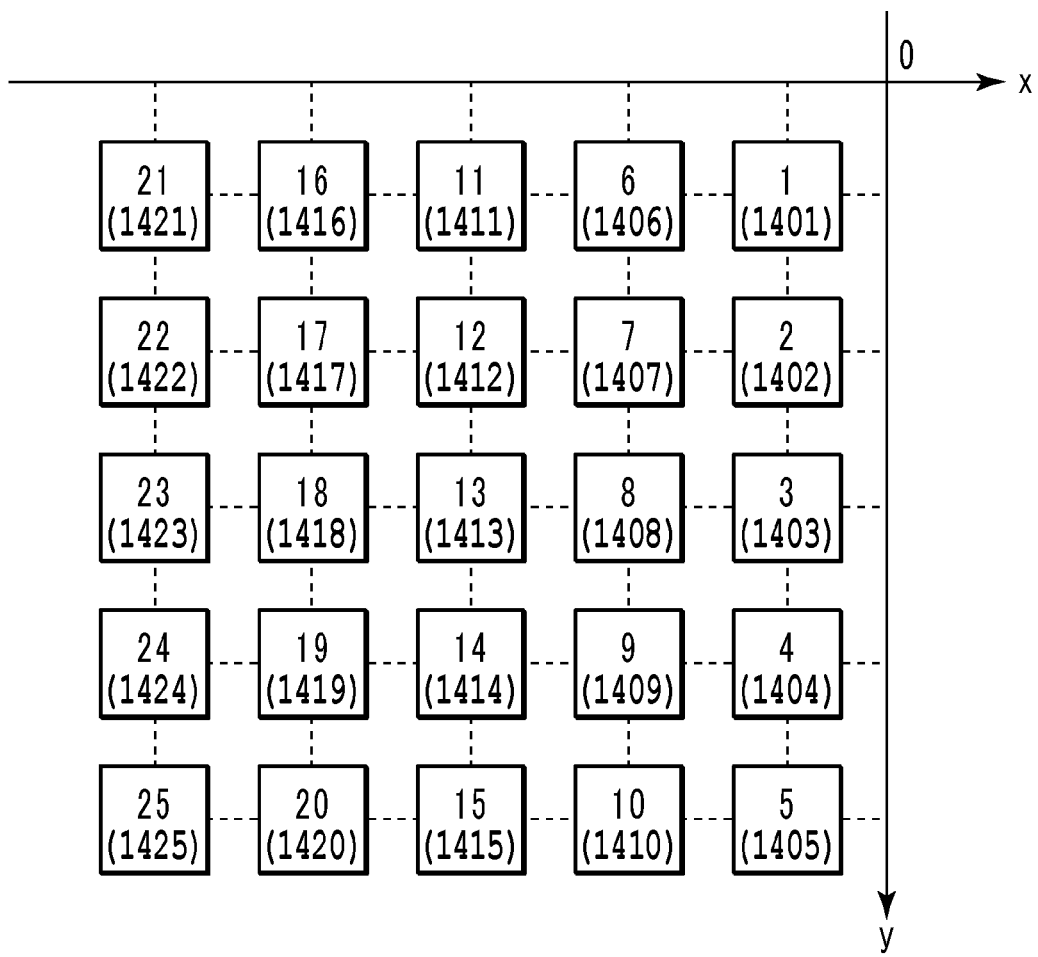
FIG. 16 is a diagram showing an arrangement after the arrangement of each angle-corrected image is changed according to the third embodiment.

At step 1504, the image processing unit 212 changes the arrangement of each angle-corrected image within the generated angle-corrected image data based on the image capturing unit arrangement information acquired at step 401 and the display angle θ set at step 402. FIG. 16 shows the arrangement of each angle-corrected image that is changed. Numerals 1 to 25 within rectangles show the index n to identify the image capturing unit and numerals within brackets thereunder show the corresponding image capturing units 1401 to 1425. As in the case of FIG. 10B according to the first embodiment, it is known that the arrangement of the captured image data here is such that the captured image by the image capturing unit 1401 is located at the upper right, the captured image by the image capturing unit 1405 at the bottom right, the captured image by the image capturing unit 1421 at the upper left, and the captured image by the image capturing unit 1425 at the bottom left.

Figure 17:
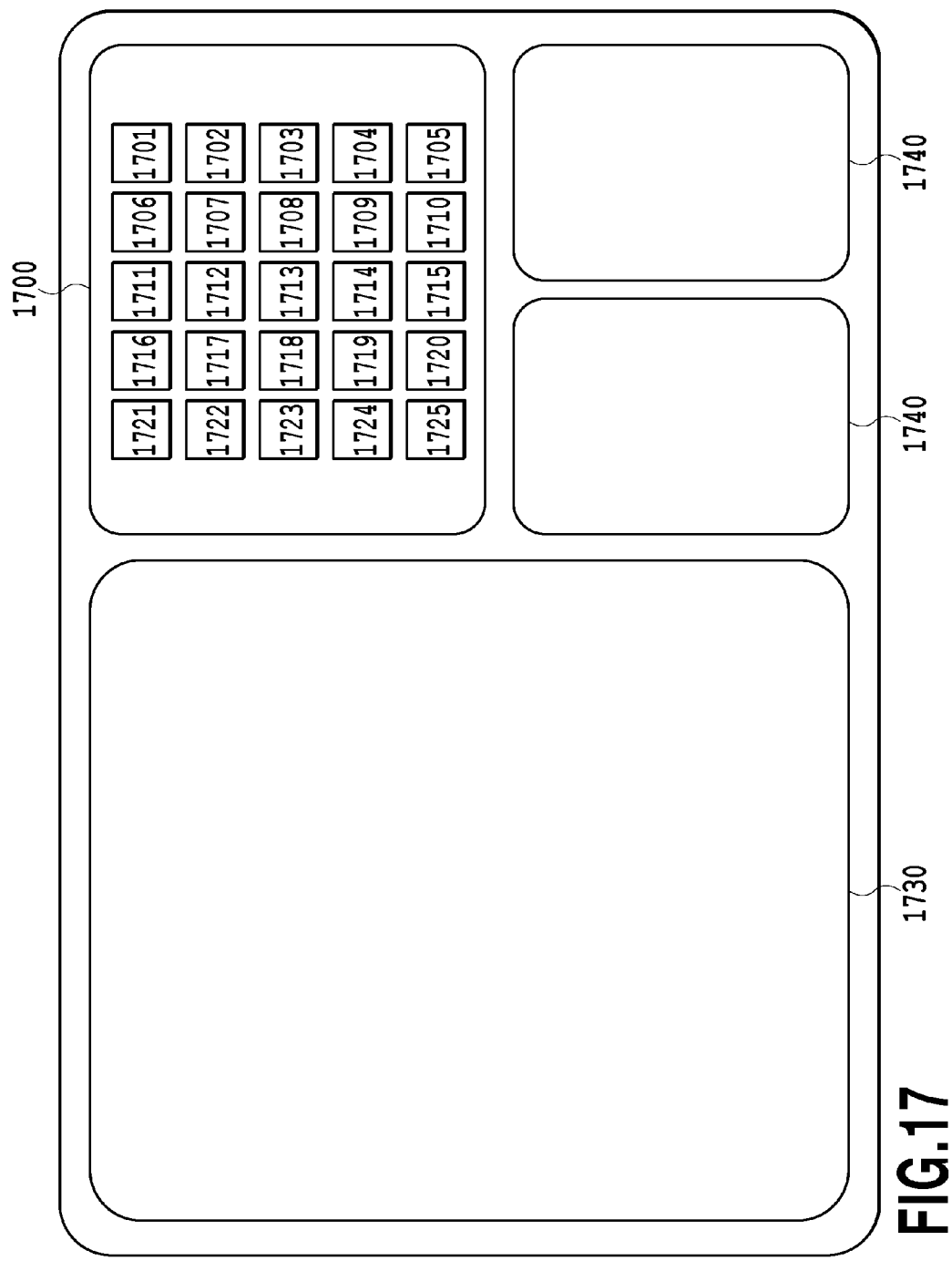
FIG. 17 is a diagram showing an example of a UI screen including a combined image display region according to the third embodiment.
Figure 18A:
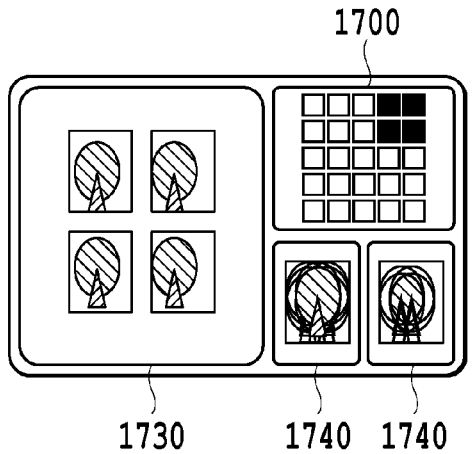
FIGS. 18A to 18E are diagrams each showing an output example of the UI screen according to the third embodiment.
Figure 18B:
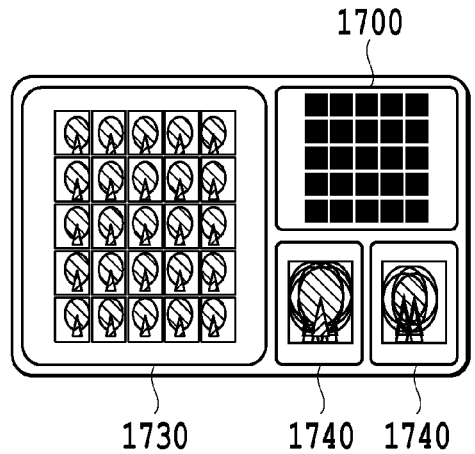
Figure 18C:
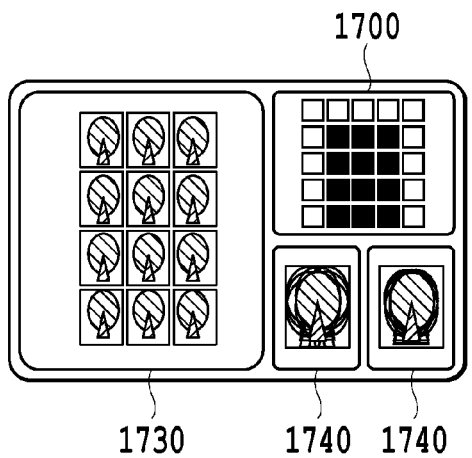
Figure 18D:
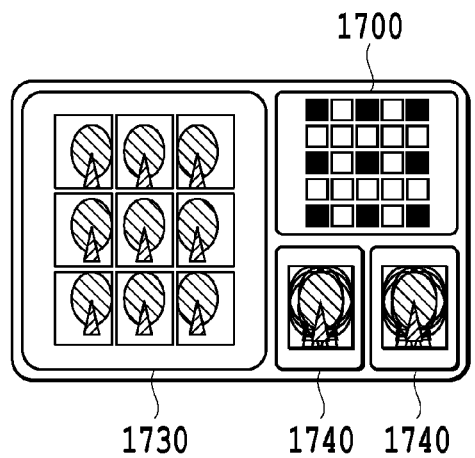
Figure 18E:
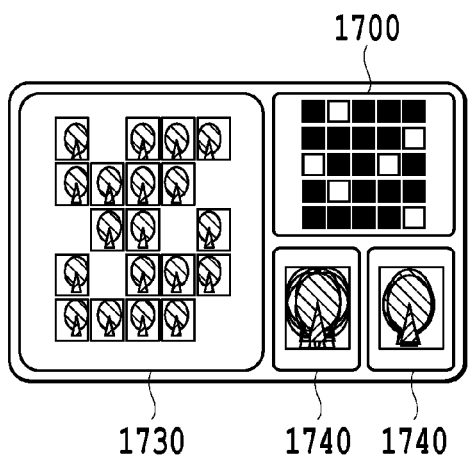

At step 1505, the image processing unit 212 creates a UI screen including image selection buttons associated with the changed arrangement and displays the UI screen on the display unit 206. In this case, it is assumed that the display unit 206 has the touch screen function and selection of an image by a user is performed via the touch screen. FIG. 17 is an example of a UI screen including an image selection region 1700 including 25 image selection buttons 1701 to 1725, a selected image display region 1730 that displays a selected image, and a combined image display region 1740 that displays a combined image. In this case, the image selection buttons 1701 to 1725 are associated with the image capturing units 1401 to 1425, respectively. A user selects any of the image selection buttons 1701 to 1725 and selects an angle-corrected image to be displayed in the selected image display region 1730.

At step 1506, the image processing unit 212 determines an angle-corrected image corresponding to the image selection button selected by the user via the UI screen described above to be an image to be displayed in the selected image display region 1730 (hereinafter, referred to as a "display image"). For example, in the case where the image selection buttons 1701, 1702, 1706, and 1707 are pressed down by the user, the angle-corrected images corresponding to the image capturing units 1401, 1402, 1406, and 1407 associated with those buttons are determined to be the display images.

At step 1507, the image processing unit 212 combines all the angle-corrected images within the angle-corrected image data generated at step 1503 to generate one piece of combined image data (whole combined image data). As the combination processing here, for example, the already-known refocus processing, super-resolution processing, etc., can be applied.

At step 1508, the image processing unit 212 combines the display images determined at step 1506 to generate one piece of combined image data (selected combined image data). The contents of the combination processing are the same as those at step 1507.

At step 1509, the image processing unit 212 rearranges the display images determined at step 1506 in accordance with the image arrangement determined at step 1504 and displays the rearranged display images in the selected image display region on the UI screen. Further, the image processing unit 212 displays the whole combined image data generated at step 1507 and the selected combined image data generated at step 1508 in the combined image display region 1740. By such a display of combined image data, it is made possible for a user to simultaneously grasp the result etc. of combination of images the user has selected.

FIGS. 18A to 18E each show an output example of the UI screen at step 1509. In FIGS. 18A to 18E, a black rectangle within the image selection region 1700 shows that a user has selected the rectangle and it is known that the angle-corrected image is displayed within the selected image display region 1730 in correspondence to the black rectangle. In the examples of FIGS. 18A to 18E, the whole combined image data is displayed in the combined image display region 1740 on the left side and the selected combined image data is displayed in the combined image display region 1740 on the right side, respectively.

In the case where the determination result at step 1501 is "No" (display angle θ=0 degrees) and the simultaneous image capturing flag is "1", the processing of each of step 1505 to step 1508 described above is also performed similarly and the captured image data is displayed on the UI screen as in FIGS. 18A to 18E as a result.

According to the present embodiment, it is possible for a user to select an image that the user desires to display by the image selection button associated with the arrangement of the image capturing units at the time of image capturing and further, it is made possible to easily grasp the relationship between the selected part of the captured images and the whole arrangement of the image capturing units.

[Fourth Embodiment]

Next, a case where the arrangement of image capturing units in a camera array is in a shape other than the square of N×N is explained as a fourth embodiment. Explanation of parts common to those of the first to third embodiments is simplified or omitted and here, different points are explained mainly.

Figure 19A:
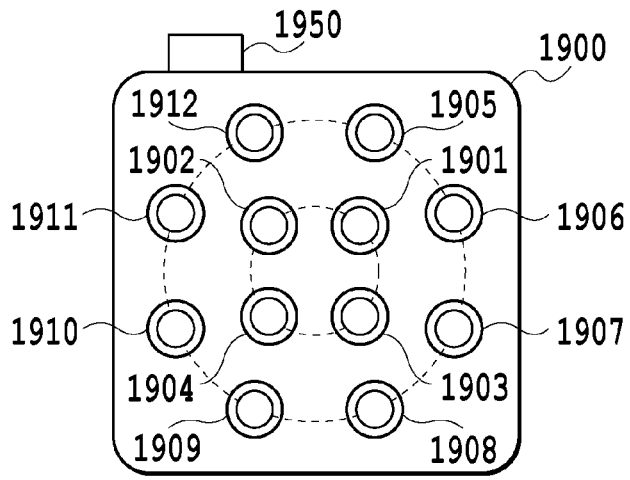
FIG. 19A is a diagram showing an external appearance of the front of a camera array according to a fourth embodiment and FIGS. 19B and 19C are each an example of a UI screen thereof.
Figure 20A:
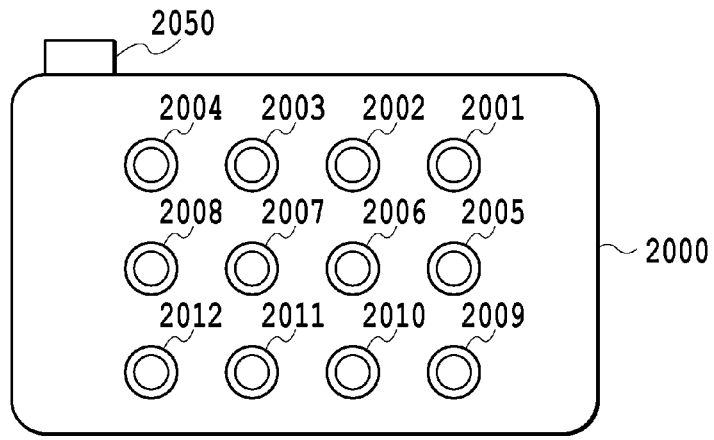
FIG. 20A is a diagram showing an external appearance of the front of a camera array according to the fourth embodiment and FIGS. 20B and 20C are each an example of a UI screen thereof.

FIG. 19A is a diagram showing an external appearance of the front of a camera array 1900 in which 12 image capturing units are arranged on two concentric circles with different diameters. Reference numeral 1910 denotes an image capturing button. FIG. 20A is a diagram showing an external appearance of the front of a camera array 2000 in which 12 image capturing units are arranged on the lattice points of a rectangle of N×M (here, N=3, M=4). Reference numeral 2010 denotes an image capturing button. The internal configurations of the camera arrays 1900 and 2000 and the contents of each processing unit are the same as those of the first embodiment, and therefore, explanation is omitted here.

Figure 19B:
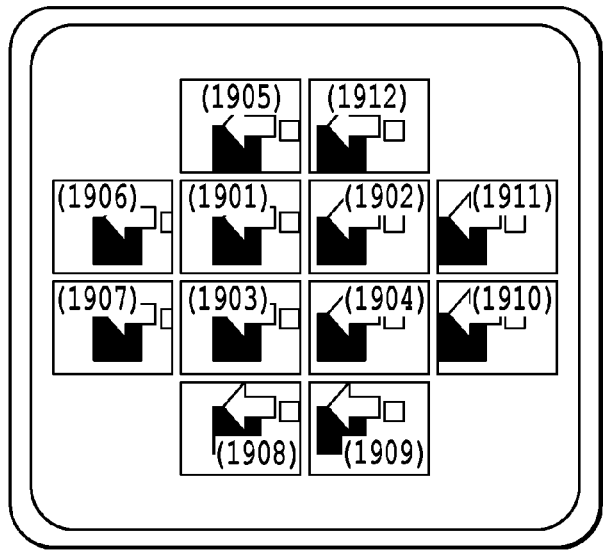
Figure 20B:
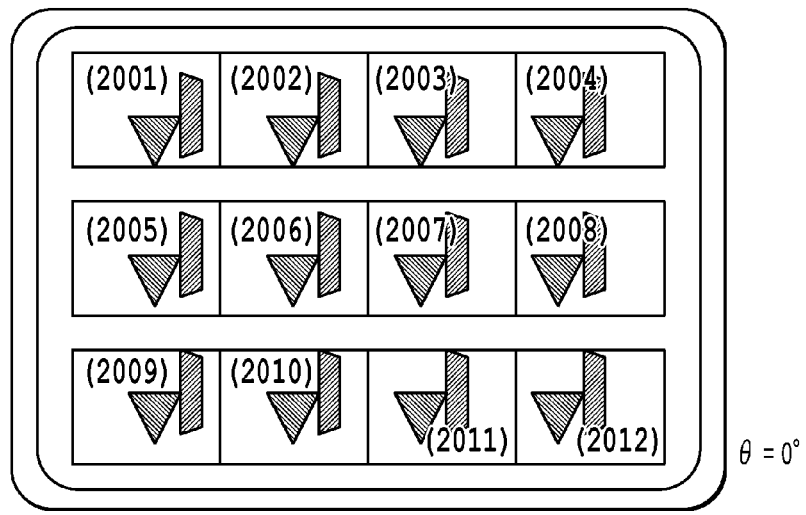

In the case where captured image data, the images of which are captured with the camera arrays 1900 and 2000 described above inclined by 90 degrees in the clockwise direction, is output as it is (display angle θ=0 degrees), UI screens as shown in FIG. 19B and FIG. 20B, respectively, are displayed on the display unit 206. Both in FIG. 19B and in FIG. 20B, numerals within brackets represent corresponding image capturing units.

Figure 19C:
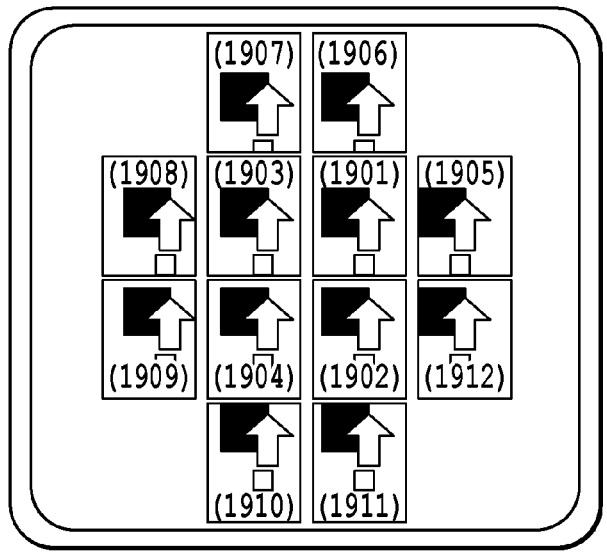
Figure 20C:
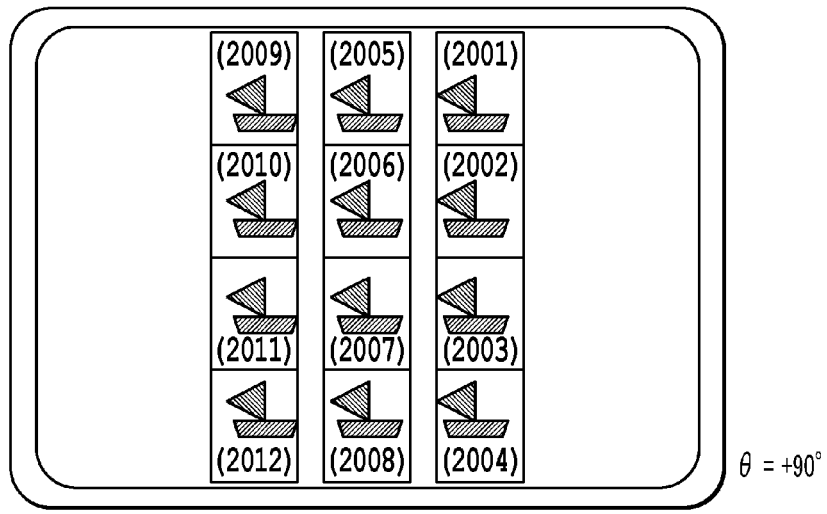
Figure 21A:
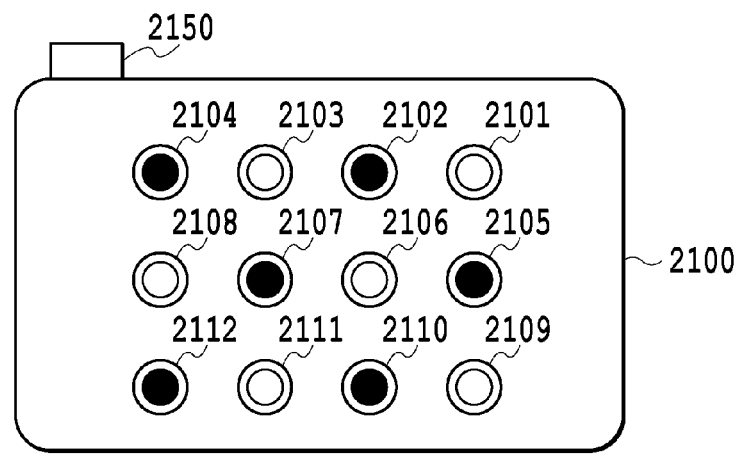
FIG. 21A is a diagram showing an external appearance of the front of a camera array according to the fourth embodiment and FIGS. 21B and 21C are each an example of a UI screen thereof.
Figure 21B:
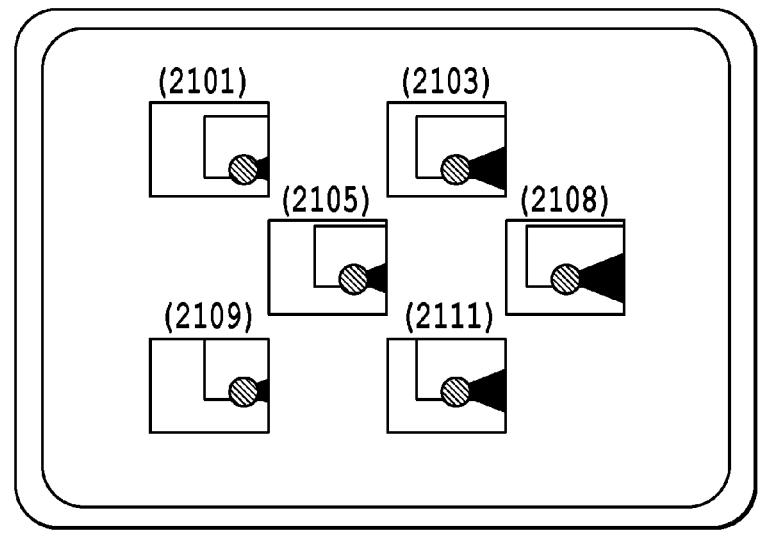
Figure 21C:
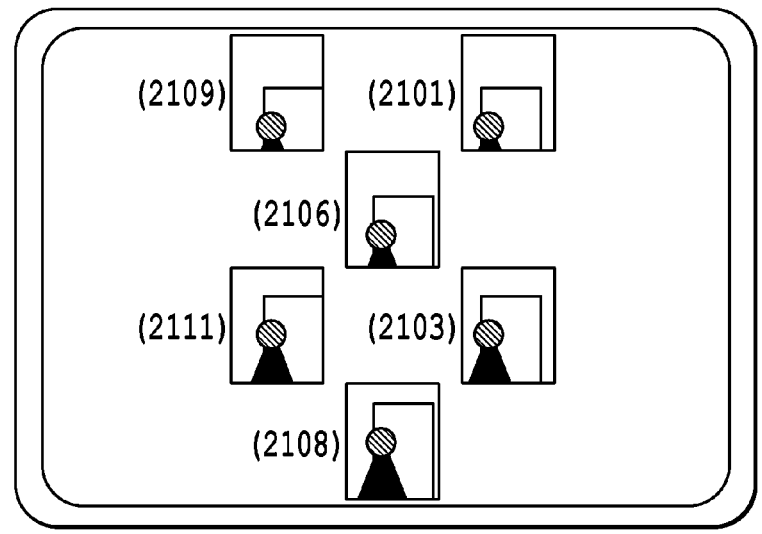

Then, FIG. 19C and FIG. 20C show UI screens displayed on the display unit 206 in the case where the captured image data is output with the display angle θ=+90 degrees. Further, FIGS. 21A to 21C show output examples in the case where the images captured by the image capturing units with black marks are not used among the images of captured image data in the case where images are captured with a camera array 2100 having the same structure as that of the camera array 2000 described above inclined by 90 degrees in the clockwise direction. In each example, it is made possible to intuitively grasp the correspondence relationship between the captured images and the arrangement of the image capturing units at the time of image capturing thereof.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-041144, filed Feb. 28, 2012, which is hereby incorporated by reference herein in its entirety.

What is claimed is:

1. An image processing device comprising:
   a first acquiring unit configured to acquire image data captured by an image capturing device, the image capturing device capturing a plurality of images corresponding to different viewpoints;
   a second acquiring unit configured to acquire rotation information representing a degree of rotation of a plurality of images in displaying the plurality of images of the captured image data or a degree of inclination of the image capturing device in capturing the plurality of images;
   a display unit configured to display the plurality of images of the captured image data in a side-by-side arrangement; and
   a determining unit configured to determine, on the basis of the rotation information, an orientation and an arrangement of the plurality of images in displaying the plurality of images of the captured image data in the side-by-side arrangement,
   wherein an arrangement of image capturing units agrees with the arrangement of captured images that are displayed.

2. The image processing device according to claim 1, wherein the determining unit determines a relationship between the orientation and the arrangement of the plurality of displayed images in a case of displaying the plurality of images in a side-by-side arrangement that is consistent with a relationship between a capturing orientation of the plurality of captured images and each viewpoint corresponding to the plurality of images.

3. The image processing device according to claim 1, wherein
   the second acquiring unit acquires rotation instructions of the plurality of images including the degree of rotation of the plurality of images in displaying the plurality of images, or a degree of inclination of the image capturing device in capturing the plurality of images, the instructions being input by a user; and
   the determining unit determines the orientation and the arrangement of the plurality of images based on the rotation instructions.

4. The image processing device according to claim 1, wherein
   the second acquiring unit acquires the degree of inclination of the image capturing device at the time of capturing the plurality of images; and
   the determining unit determines the orientation and the arrangement of the plurality of images based on the degree of inclination.

5. The image processing device according to claim 4, wherein the determining unit selects, from a plurality of angles set at predetermined intervals, an angle closest to an angle indicating the degree of inclination, and determines the orientation and the arrangement of the plurality of images based on the selected angle.

6. The image processing device according to claim 4, wherein
   the image capturing device includes an acceleration sensor; and
   the second acquiring unit acquires the degree of inclination of the image capturing device based on an output from the acceleration sensor.

7. The image processing device according to claim 1, wherein
   the second acquiring unit further acquires information about a positional relationship among a plurality of viewpoints corresponding to the plurality of images; and
   the determining unit determines the orientation and the arrangement of the plurality of images based further on the acquired positional relationship.

8. The image processing device according to claim 1, further comprising:
   a third acquiring unit configured to acquire user instructions to select some of the plurality of images, the instructions being given to display the plurality of images aligned in an orientation and an arrangement determined by the determining unit; and
   a combining unit configured to generate a combined image by combining images selected by the user instructions acquired by the third acquiring unit.

9. The image processing device according to claim 8, further comprising a generating unit for generating a display image displaying an image selected among the plurality of images by the user instructions and the combined image.

10. An image processing device comprising:
    a first acquiring unit configured to acquire image data captured by an image capturing device, the image capturing device capturing a plurality of images corresponding to different viewpoints;
    a second acquiring unit configured to acquire rotation information representing rotation instructions of the plurality of images input by a user, the instructions including a degree of rotation of the plurality of images of the captured image data, or a degree of inclination of the image capturing device in capturing the plurality of images;
    a display unit configured to display the plurality of images of the captured image data in a side-by-side arrangement; and
    a determining unit configured to determine, on the basis of the rotation information, information indicating an orientation and an arrangement of the plurality of images in a case of displaying the plurality of images in the side-by-side arrangement,
    wherein an arrangement of image capturing units agrees with the arrangement of captured images that are displayed.

11. An image processing device comprising:
    a first acquiring unit configured to acquire image data captured by an image capturing device, the image capturing device capturing a plurality of images corresponding to different viewpoints;
    a second acquiring unit configured to acquire rotation information representing rotation instructions of the plurality of images input by a user, the instructions including a degree of rotation of the plurality of images of the captured image data, or a degree of inclination of the image capturing device in capturing the plurality of images; and
    a display unit configured to display the plurality of images of the captured image data in a side-by-side arrangement,
    wherein in a case where a degree of rotation of the plurality of images in displaying the plurality of images or a degree of inclination of the image capturing device in capturing the plurality of images is changed, both an orientation and an arrangement of the plurality of images are changed in conjunction therewith in the displaying in the display unit,
wherein an arrangement of image capturing units agrees with the arrangement of captured images that are displayed.

12. The image processing device according to claim 1, further comprising a display unit for displaying the plurality of images in the orientation and the arrangement determined by the determining unit.

13. The image processing device according to claim 1, wherein the image capturing device is a camera array image capturing device including a plurality of image capturing units.

14. An image capturing device having the image processing device, the image processing device comprising:
  a first acquiring unit configured to acquire image data captured by an image capturing device, the image capturing device capturing a plurality of images corresponding to different viewpoints;
  a second acquiring unit configured to acquire rotation information representing a degree of rotation of a plurality of images in displaying the plurality of images of the captured image data or a degree of inclination of the image capturing device in capturing the plurality of images;
  a display unit configured to display the plurality of images of the captured image data in a side-by-side arrangement;
  a determining unit configured to determine, on the basis of the rotation information, an orientation and an arrangement of the plurality of images in displaying the plurality of images of the captured image data in the side-by-side arrangement,
  wherein the arrangement of image capturing units agrees with the arrangement of captured images that are displayed, and
  wherein the image capturing device simultaneously captures a plurality of images corresponding to different viewpoints.

15. An image processing method comprising the steps of:
  acquiring image data captured by an image capturing device, the image capturing device capturing a plurality of images corresponding to different viewpoints;
  acquiring rotation information representing a degree of rotation of a plurality of images in displaying the plurality of images of the captured image data or a degree of inclination of the image capturing device in capturing the plurality of images;
  displaying the plurality of images of the captured image data in a side-by-side arrangement; and
  determining, on the basis of the rotation information, an orientation and an arrangement of the plurality of images in displaying the plurality of images of the captured image data in the side-by-side arrangement,
  wherein an arrangement of image capturing units agrees with the arrangement of captured images that are displayed.

16. An image processing method comprising the steps of:
  acquiring image data captured by an image capturing device, the image capturing device capturing a plurality of images corresponding to different viewpoints;
  acquiring rotation information representing rotation instructions of the plurality of images input by a user, the instructions including a degree of rotation of the plurality of images of the captured image data, or a degree of inclination of the image capturing device in capturing the plurality of images;
  displaying the plurality of images of the captured image data in a side-by-side arrangement; and
  determining, on the basis of the rotation information, information indicating an orientation and an arrangement of the plurality of images in arranging the plurality of images in a case of displaying the plurality of images in the side-by-side arrangement,
  wherein an arrangement of image capturing units agrees with the arrangement of captured images that are displayed.

17. An image processing method comprising the steps of:
  acquiring image data captured by an image capturing device, the image capturing device capturing a plurality of images corresponding to different viewpoints;
  acquiring rotation information representing rotation instructions of the plurality of images input by a user, the instructions including a degree of rotation of the plurality of images of the captured image data, or a degree of inclination of the image capturing device in capturing the plurality of images; and
  displaying the plurality of images of the captured image data in a side-by-side arrangement, wherein in a case where a degree of rotation of the plurality of images in displaying the plurality of images or a degree of inclination of the image capturing device in capturing the plurality of images is changed, both an orientation and an arrangement of the plurality of images are changed in conjunction therewith in the displaying in the display unit,
  wherein an arrangement of image capturing units agrees with the arrangement of captured images that are displayed.

18. A program stored in a non-transitory computer readable storage medium for causing a computer to perform the image processing method, the method comprising the steps of:
  acquiring image data captured by an image capturing device, the image capturing device capturing a plurality of images corresponding to different viewpoints;
  acquiring rotation information representing a degree of rotation of a plurality of images in displaying the plurality of images of the captured image data or a degree of inclination of the image capturing device in capturing the plurality of images;
  displaying the plurality of images of the captured image data in a side-by-side arrangement; and
  determining, on the basis of the rotation information, an orientation and an arrangement of the plurality of images in displaying the plurality of images of the captured image data in the side-by-side arrangement,
  wherein the arrangement of image capturing units agrees with the arrangement of captured images that are displayed.

* * * * *